(12) United States Patent
Macwan et al.

(10) Patent No.: US 8,423,578 B2
(45) Date of Patent: *Apr. 16, 2013

(54) MESSAGING PERSONALIZATION

(75) Inventors: Sanjay Macwan, Marlboro, NJ (US); Gustavo De Los Reyes, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,594

(22) Filed: Aug. 22, 2012

(65) Prior Publication Data

US 2012/0317221 A1 Dec. 13, 2012

Related U.S. Application Data

(63) Continuation of application No. 12/342,395, filed on Dec. 23, 2008, now Pat. No. 8,275,798.

(51) Int. Cl.
*G06F 15/16* (2006.01)
*G06F 17/30* (2006.01)

(52) U.S. Cl.
USPC .............. 707/796; 707/999.006; 709/207

(58) Field of Classification Search .......... 707/705, 707/754, 796, 803, 999.002, 999.006; 709/204, 709/207
See application file for complete search history.

(56) References Cited

U.S. PATENT DOCUMENTS

| | | | |
|---|---|---|---|
| 6,480,885 B1 * | 11/2002 | Olivier | 709/207 |
| 7,797,642 B1 * | 9/2010 | Karam et al. | 715/810 |
| 2002/0133555 A1 | 9/2002 | Hall et al. | |
| 2003/0115279 A1 | 6/2003 | Quine et al. | |
| 2003/0233418 A1 | 12/2003 | Goldman | |
| 2004/0181581 A1 | 9/2004 | Kosco | |
| 2005/0188043 A1 | 8/2005 | Cortright et al. | |
| 2005/0198143 A1 | 9/2005 | Moody et al. | |
| 2005/0223063 A1 | 10/2005 | Chang et al. | |
| 2007/0067394 A1 | 3/2007 | Adams et al. | |
| 2007/0294428 A1 | 12/2007 | Guy et al. | |

OTHER PUBLICATIONS

Bedingfielid; Final Office Action mailed Oct. 25, 2011 for U.S. Appl. No. 11/561,189, filed Nov. 17, 2006.
Bedingfield; Final Office Action mailed Nov. 22, 2010 for U.S. Appl. No. 11/561,189, filed Nov. 17, 2006.
Bedingfield; Final Office Action mailed Nov. 3, 2009 for U.S. Appl. No. 11/561,189, filed Nov. 17, 2006.
Bedingfield; Non-Final Office Action mailed Jun. 23, 2010 for U.S. Appl. No. 11/561,189, filed Nov. 17, 2006.
Bedingfield; Non-Final Office Action mailed Jul. 5, 2011 for U.S. Appl. No. 11/561,189, filed Nov. 17, 2006.
Bedingfield; Non-Final Rejection mailed May 7, 2009 for U.S. Appl. No. 11/561,189, filed Nov. 17, 2006.
Bedingfield; U.S. Patent Application Entitled: Systems and Methods for Displaying Electronic Mail Messages, filed Nov. 17, 2006, having U.S. Appl. No. 11/561,189.

(Continued)

*Primary Examiner* — Marc Filipczyk
(74) *Attorney, Agent, or Firm* — Wolff & Samson, PC

(57) ABSTRACT

Participants in a communication are rendered by determining whether each entry in a list of participants in the communication satisfies criteria specified by a user participating in the communication. The criteria are used to identify a first subset of participants that is to be rendered in a first style that differentiates the first subset from remaining participants in the list. The first subset of participants is formatted in the first style.

20 Claims, 19 Drawing Sheets

OTHER PUBLICATIONS

Bedingfield Sr.; Non-Final Office Action mailed Apr. 24, 2012 for U.S. Appl. No. 11/561,189, filed Nov. 17, 2006.
Macwan; Final Office Action mailed Feb. 21, 2012 for U.S. Appl. No. 12/342,395, filed Dec. 23, 2008.
Macwan; Final Office Action mailed Jun. 10, 2011 for U.S. Appl. No. 12/342,395, filed Dec. 23, 2008.
Macwan; Non-Final Office Action mailed Jan. 13, 2011 for U.S. Appl. No. 12/342,395, filed Dec. 23, 2008.
Macwan; Non-Final Office Action mailed Sep. 28, 2011 for U.S. Appl. No. 12/342,395, filed Dec. 23, 2008.
Macwan; Notice of Allowance mailed Jun. 8, 2012 for U.S. Appl. No. 12/342,395, filed Dec. 23, 2008.

* cited by examiner

RECEIVED: FROM PSMTP.COM TUE, 25 NOV 2008 13:58:11
RECEIVED: FROM SOURCE ([74.7.X.XX]) BY EX.FOO.COM ([64.18.X.XX])
    WITH SMTP
    TUE, 25 NOV 2008 13:58:01 (EST)   } 510
DATE: TUE, 25 NOV 2008 13:58:23

MIME-VERSION: 1.0
MESSAGE ID: <3BB0D56894826243AB7E1@GVW1120EXC.FOO.NET>

FROM: "JONES, RHONDA" <RHONDA.JONES@FOO.COM>   } 520

TO: "ADAM SMITH, PRESIDENT" <ADAM.SMITH@FOO.COM>, "TIM BRACEY, TAX DEPT." <TIM.BRACEY@FOO.COM>, "RON FRANKLIN, LEGAL DEPT." <RON.FRANKLIN@FOO.COM>, "JOE CARL, LEGAL DEPT." <JOE.CARL@FOO.COM>, "BOB MARINO, VICE PRESIDENT" <BOB.MARINO@FOO.COM>, "HEATHER THOMAS, TAX DEPT." <HEATHER.THOMAS@FOO.COM>, "OLIVER PEREZ, ENGINEER" <OLIVER.PEREZ@FOO.COM>, "JEFF ROSS, ENGINEER" <JEFF.ROSS@FOO.COM>, "TROY.FLOYD, LEGAL" <TROY.FLOYD@FOO.COM>, "PABLO RODRIGUEZ, TAX DEPT." <PABLO.RODRIGUEZ@FOO.COM>, "KEVIN THOMAS, LEGAL SUPERVISOR" <KEVIN.THOMAS@FOO.COM>, "DAVID POWERS, ENGINEER" <DAVID.POWERS@FOO.COM>, "ALICE WEBB, ENGINEER" <ALICE.WEBB@FOO.COM> . . .

CC: "ERIN ROSS, INFO. SECURITY" <ERIN.ROSS@FOO.COM>, "ALISON LANE, INFO. SECURITY" <ALISON.LANE@FOO.COM>

SUBJECT: RE                                                525

CONTENT-TYPE: TEXT/PLAIN; CHARSET=US-ASCII
CONTENT-TRANSFER-ENCODING: 7-BIT
CONTENT-DISPOSITION: INLINE

EVERYONE:

PLEASE DO NOT OPEN ANY ATTACHMENTS YOU MAY RECEIVE TODAY UNTIL FURTHER NOTICE. THERE IS A VIRUS GOING AROUND.
                                                           540
                                                           500

FIG. 5A

RECEIVED: FROM PSMTP.COM TUE, 25 NOV 2008 13:58:11
RECEIVED: FROM SOURCE ([74.7.X.XX]) BY EX.FOO.COM ([64.18.X.XX])
    WITH SMTP
    TUE, 25 NOV 2008 13:58:01 (EST)
DATE: TUE, 25 NOV 2008 13:58:23

MIME-VERSION: 1.0
MESSAGE ID: <3BB0D56894826243AB7E1@GVW1120EXC.FOO.NET>

FROM: "JONES, RHONDA" <RHONDA.JONES@FOO.COM>
                580         590
TO: "ADAM SMITH, PRESIDENT" <ADAM.SMITH@FOO.COM>,
"TIM BRACEY, TAX DEPT RED." <TIM.BRACEY@FOO.COM>, "RON FRANKLIN, LEGAL DEPT." <RON.FRANKLIN@FOO.COM>, "JOE CARL, LEGAL DEPT." <JOE.CARL@FOO.COM>, "BOB MARINO, VICE PRESIDENT" <BOB.MARINO@FOO.COM>, "HEATHER THOMAS, TAX DEPT." <HEATHER.THOMAS@FOO.COM>, "OLIVER PEREZ, ENGINEER" <OLIVER.PEREZ@FOO.COM>, "JEFF ROSS, ENGINEER" <JEFF.ROSS@FOO.COM>, "TROY.FLOYD, LEGAL" <TROY.FLOYD@FOO.COM>, "PABLO RODRIGUEZ, TAX DEPT." <PABLO.RODRIQUEZ@FOO.COM>, "KEVIN THOMAS, LEGAL SUPERVISOR" <KEVIN.THOMAS@FOO.COM>, "DAVID POWERS, ENGINEER" <DAVID.POWERS@FOO.COM>, "ALICE WEBB, ENGINEER" <ALICE.WEBB@FOO.COM> . . .

CC: "ERIN ROSS, INFO. SECURITY" <ERIN.ROSS@FOO.COM>, "ALISON LANE, INFO. SECURITY" <ALISON.LANE@FOO.COM>

SUBJECT: RE

CONTENT-TYPE: TEXT/PLAIN; CHARSET=US-ASCII
CONTENT-TRANSFER-ENCODING: 7-BIT
CONTENT-DISPOSITION: INLINE

EVERYONE:

PLEASE DO NOT OPEN ANY ATTACHMENTS YOU MAY RECEIVE TODAY UNTIL FURTHER NOTICE. THERE IS A VIRUS GOING AROUND.

FIG. 5B

```
JOE CARL'S EMAIL
FILE   EDIT  VIEW  TOOLS                    C1  C2  C3
FROM            SUBJECT                        RECEIVED

RHONDA JONES    RE:                    OCTOBER 31, 2001
                                                          600

FROM: RHONDA JONES <RHONDAJONES@MAIL.COM>
    TO:   ADAM SMITH, PRESIDENT; TIM BRACEY, TAX DEPT.; RON
          FRANKLIN, LEGAL DEPT., JOE CARL, LEGAL DEPT.; BOB
          MARINO, VICE PRESIDENT; HEATHER THOMAS, TAX DEPT.;
          OLIVER PEREZ, ENGINEER; JEFF ROSS, ENGINEER; TROY
          FLOYD, LEGAL; PABLO RODRIGUEZ, TAX DEPT.; KEVIN THOMAS,
          LEGAL SUPERVISOR; DAVID POWERS, ENGINEER; ALICE WEBB,
    CC:   ERIN ROSS, INFO. SECURITY; ALISON LANE, INFO. SECURITY
610
    EVERYONE:

PLEASE DO NOT OPEN ANY ATTACHMENTS YOU MAY RECEIVE TODAY
    UNTIL FURTHER NOTICE. THERE IS A VIRUS GOING AROUND.

```
JOE CARL'S EMAIL
FILE   EDIT   VIEW   TOOLS            C1 C2 C3
FROM              SUBJECT                      RECEIVED

RHONDA JONES    RE:                       OCTOBER 31, 2001
```

FROM: RHONDA JONES <RHONDA.JONES@MAIL.COM> SENT OCT. 31, 2001

TO: RON FRANKLIN, LEGAL DEPT.; JOE CARL, LEGAL DEPT.; TROY FLOYD, LEGAL; KEVIN THOMAS, LEGAL SUPERVISOR; JIMMY SEXTON, LEGAL DEPT.; GEORGE THOMAS, LEGAL DEPT.; ADAM SMITH, PRESIDENT; TIM BRACEY, TAX DEPT.; BOB MARINO, VICE PRESIDENT; HEATHER THOMAS, TAX DEPT.; OLIVER PEREZ, ENGINEER; JEFF ROSS, ENGINEER; PABLO RODRIGUEZ, TAX

710A / 710B

CC: ERIN ROSS, INFO. SECURITY; ALISON LANE, INFO. SECURITY

610

EVERYONE:

PLEASE DO NOT OPEN ANY ATTACHMENTS YOU MAY RECEIVE TODAY UNTIL FURTHER NOTICE. THERE IS A VIRUS GOING AROUND.

```
JOE CARL'S EMAIL
FILE   EDIT  VIEW  TOOLS              |C1||C2||C3|
FROM         SUBJECT                         RECEIVED

RHONDA JONES   RE:                      OCTOBER 31, 2001
```

| FROM: | RHONDA JONES <RHONDA.JONES@MAIL.COM> |
|---|---|
| TO: | ADAM SMITH, PRESIDENT; TIM BRACEY, TAX DEPT.; RON FRANKLIN, LEGAL DEPT., JOE CARL, LEGAL DEPT.; BOB MARINO, VICE PRESIDENT; HEATHER THOMAS, TAX DEPT.; OLIVER PEREZ, ENGINEER; JEFF ROSS, ENGINEER; TROY FLOYD, LEGAL; PABLO RODRIGUEZ, TAX DEPT.; KEVIN THOMAS, LEGAL SUPERVISOR; DAVID POWERS, ENGINEER; ALICE WEBB, |
| CC: | ERIN ROSS, INFO. SECURITY; ALISON LANE, INFO. SECURITY |

EVERYONE:

PLEASE DO NOT OPEN ANY ATTACHMENTS YOU MAY RECEIVE TODAY UNTIL FURTHER NOTICE. THERE IS A VIRUS GOING AROUND.

```
JOE CARL'S EMAIL
FILE  EDIT  VIEW  TOOLS                    |C1||C2||C3|
FROM           SUBJ                              RECEIVED

RHONDA JONES   RE:                       OCTOBER 31, 2001
```

```
FROM:  RHONDA JONES <RHONDA.JONES@MAIL.COM>
TO:    ADAM SMITH, PRESIDENT; TIM BRACEY, TAX DEPT.; RON
       FRANKLIN, LEGAL DEPT.; JOE CARL, LEGAL DEPT.; BOB
       MARINO, VICE PRESIDENT; HEATHER THOMAS, TAX DEPT.;
       OLIVER PEREZ, ENGINEER; JEFF ROSS, ENGINEER; TROY
       FLOYD, LEGAL; PABLO RODRIGUEZ, TAX DEPT.; KEVIN THOMAS,
       LEGAL SUPERVISOR; DAVID POWERS, ENGINEER; ALICE WEBB,
CC:    ERIN ROSS, INFO. SECURITY; ALISON LANE, INFO. SECURITY

EVERYONE:

PLEASE DO NOT OPEN ANY ATTACHMENTS YOU MAY RECEIVE TODAY
UNTIL FURTHER NOTICE. THERE IS A VIRUS GOING AROUND.

MESSAGING PERSONALIZATION

CROSS-REFERENCE TO RELATED APPLICATION

This application is a continuation of copending U.S. utility application entitled, "Messaging Personalization," having Ser. No. 12/342,395, filed Dec. 23, 2008, which is entirely incorporated herein by reference.

BACKGROUND

The present disclosure is generally related to electronic messaging and, more particularly, is related to rendering of messaging participants.

Electronic messaging, such as e-mail, is routinely used for both personal and corporate communication. When receiving an e-mail message addressed to a group of recipients, a recipient often has only limited information about the identity of other recipients to which the message is addressed. For example, the recipient may not be aware of the placement of a fellow recipient within an organizational hierarchy or of the existence of fellow team members among a list of recipients. The problem is made worse by having a large number of recipients to which the message is addressed making it cumbersome to scan all of the names of the intended recipients.

SUMMARY

Embodiments of the present disclosure provide systems and methods of rendering participants in a communication. One embodiment of such a system comprises a computing device executing messaging engine instructions configuring the device to determine whether each entry in a list of participants in the communication satisfies criteria specified by a user participating in the communication. The criteria are used to identify a first subset of participants that are to be rendered in a first style that differentiates the first subset from remaining participants in the list. The computing device is configured to format the first subset of participants in the first style.

One embodiment of a method of rendering participants in a communication can be broadly summarized as follows: determining whether each entry in a list of participants in the communication satisfies criteria specified by a user participating in the communication, where the criteria is used to identify a first subset of participants that are to be rendered in a first style that differentiates the first subset from remaining participants in the list; and formatting the first subset of participants in the first style.

Other systems, methods, devices, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5A is a diagram of a SMTP e-mail message, showing its constituent parts in accordance with an embodiment of the present disclosure.

FIG. 5B is a diagram of a modified SMTP e-mail message utilizing a descriptive tag in accordance with an embodiment of the present disclosure.

FIGS. 6-10 are diagram representations of a messaging client interface displaying an e-mail message in accordance with an embodiment of the present disclosure.

DETAILED DESCRIPTION

Figure 1:
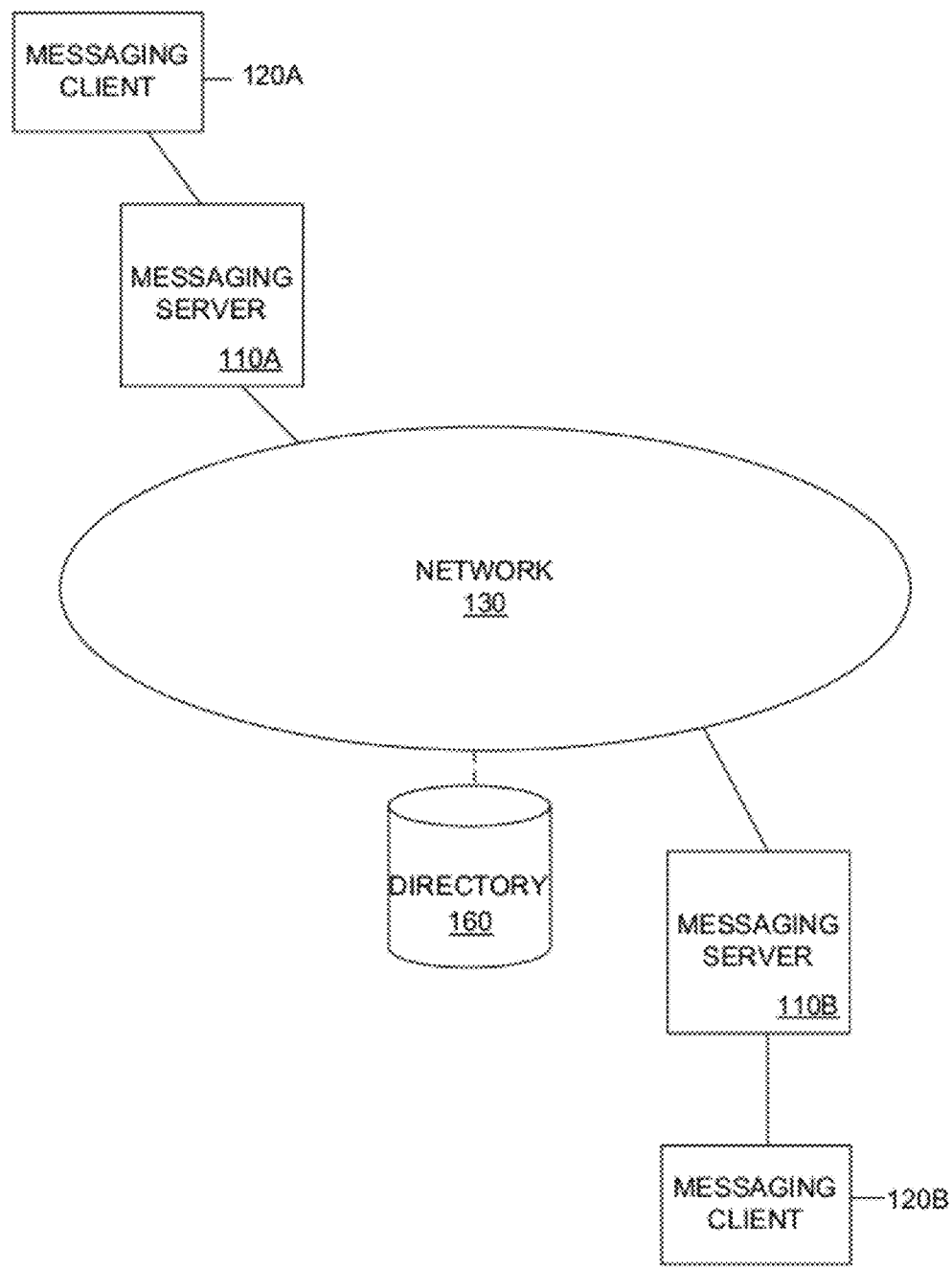
FIG. 1 is a block diagram of an environment in which one embodiment of a system and method for displaying or rendering electronic messages is implemented.

FIG. 1 is a block diagram of an environment in which one embodiment of a system and method for displaying or rendering electronic messages is implemented. In an exemplary embodiment, among others, two messaging servers (110A and 110B) and two messaging clients (120A, 120B) communicate over a network 130. However, an exemplary environment may have more or less than two messaging servers and/or messaging clients. The messaging server(s) and/or messaging client(s) may encompass a variety of communication modes and devices, including e-mail, instant messaging, chat, teleconference, smartphones, IPTV (Internet protocol television), web applications, etc.

The messaging server 110A provides electronic mail (e-mail) services and/or other messaging services to the messaging client 120A, allowing the client 120B to send e-mail messages to, and receive e-mail messages from, other messaging clients. This includes intra-domain messaging and inter-domain messaging. The messaging server 110B provides similar e-mail services to the messaging client 120B. Messaging servers 110A, 110B and messaging clients 120A, 120B are not limited to performing e-mail communications and may utilize other messaging forms, including analog and digital mediums.

Figure 2:
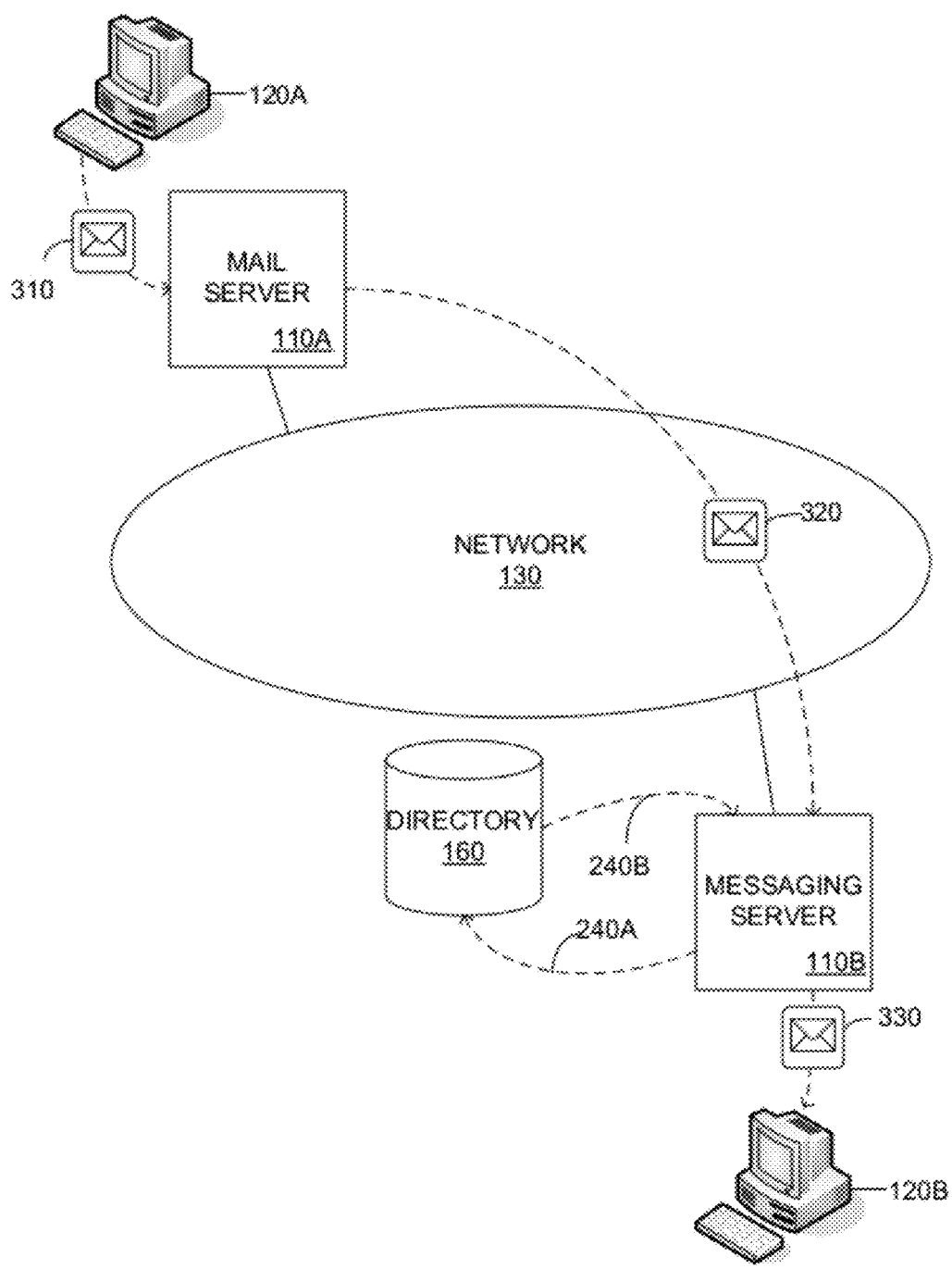
FIGS. 2-3 are block diagrams of the environment of FIG. 1 showing possible communication paths within the environment.
Figure 3:
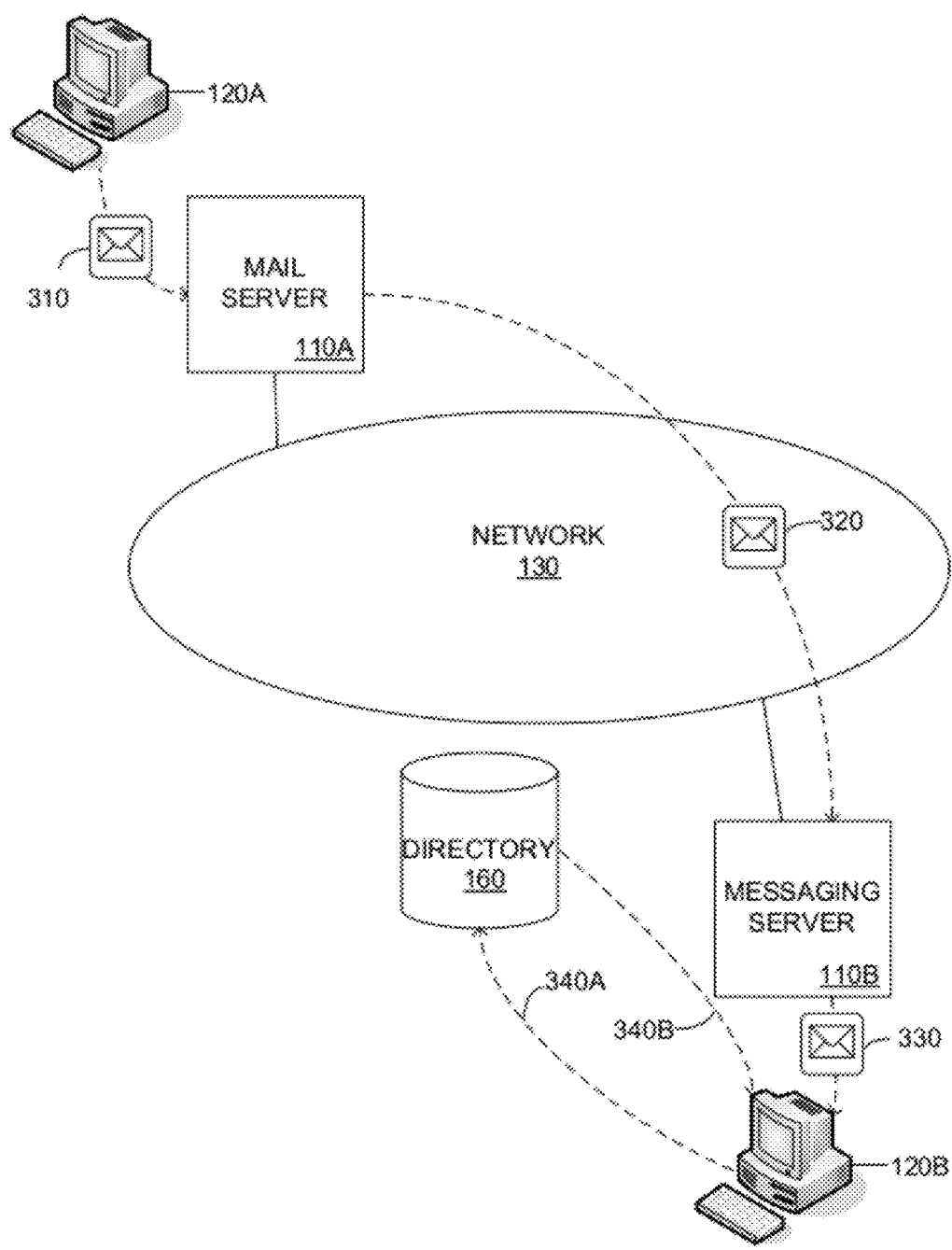

A directory database 160 may reside in a messaging server (e.g., server 110B) (as represented by paths 240A,B in FIG. 2) or in a messaging client (e.g., client 120A1) (as represented by paths 340A,B in FIG. 3). The directory database 160 is also known as an enterprise database or an employee database, in some contexts. For example, some companies maintain internal directories which can only be accessed by employees. Such directories provide a telephone number, FAX number, e-mail address, and mailing address of certain individuals associated with the company, among other information such as company organizational information and the individual's work location and room number.

In some embodiments, a messaging server 110B can be utilized to retrieve recipient information from the directory database 160. For example, the directory database 160 may contain information on an employee, such as the employee's job title, job location, department, rank, etc. Given that most corporations have an employee directory that communications such as e-mail and conference bridges tap into, these directory databases can be leveraged to determine who is on a recipient list for respective messaging media and highlight names in the list according to predefined criteria or criteria specified by a user before making a query. Therefore, the message can be personalized according to user criteria. So when a user gets an e-mail with 500 people copied on the e-mail, on the user's side of the messaging client, the user can clearly see who from his or her team is included in the recipient list and can identify members of the user's chain of command that are on the list. With this information, the user can make judgments on the appropriate actions for handling the received e-mail (such as whether he or she needs to forward the e-mail message to someone else). Similar identifications and demarcations may also be made for other messaging mediums, such as those involving a conference bridge or chat communications, as discussed hereinafter.

Figure 4:
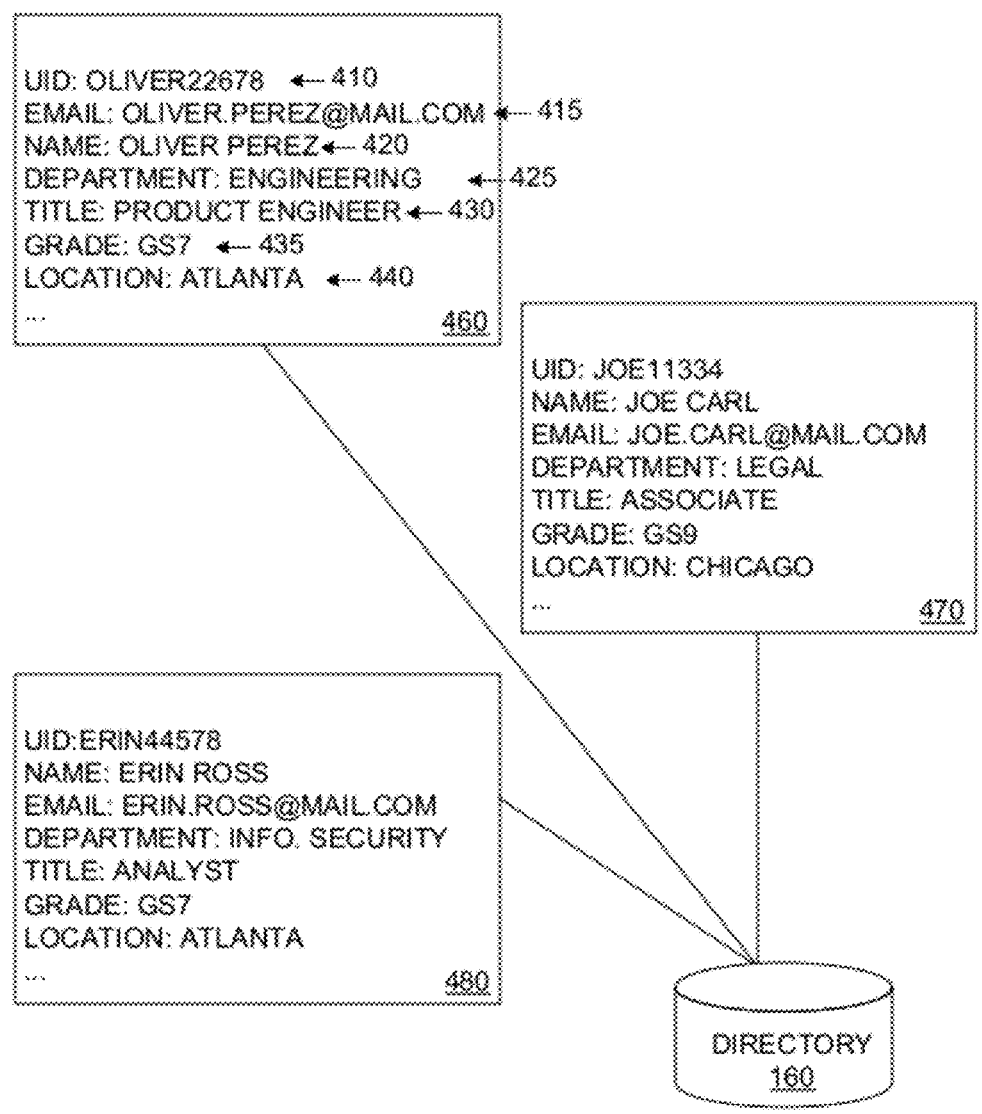
FIG. 4 is a schematic diagram of one embodiment of the directory database from FIG. 1.

FIG. 4 is a schematic diagram of one embodiment of the directory database 160. Exemplary directory database 160 includes fields for username or user ID (410), e-mail address (415), personal name (420), department (425), position or job title (430), job grade or rank (435), and job or office location (440). The directory database 160 may also include any number of member records. According to an exemplary embodiment, the directory database 160 includes three record entries: entry 460; entry 470; and entry 480.

A recipient query of the directory database 160 to obtain additional information may include the e-mail address 415 for an entry in the recipient list, and returns a result of the query, such as a department 425 to which the user associated with the e-mail address belongs.

Delivery of intra-domain e-mail messages can be accomplished with a single messaging server—the messaging server for the domain. Messaging servers may communicate with each other to deliver inter-domain e-mail messages. For example, an e-mail message from the messaging client 120A to the messaging client 120B is accomplished as follow. The e-mail message is communicated first from the messaging client 120A to the local messaging server (the messaging server 110A), then to the remote messaging server (the messaging server 110B), then to the recipient (the messaging client 120B), as shown by paths 310, 320, and 330 in FIGS. 2-3. According to exemplary embodiments, SMTP (Simple Mail Transfer Protocol) is used for communication between messaging servers, and POP (Post Office Protocol) or IMAP (Internet Mail Access Protocol) is used for communication between messaging clients and a messaging server. However, a person of ordinary skill in the art should understand that the principles described herein are applicable to other e-mail protocols as well.

Referring to FIG. 4, in an exemplary embodiment, when an e-mail message is received by a messaging server 110B servicing a particular recipient, the messaging server 110B taps into a directory database 160 and based on user criteria, reworks the e-mail message by adding formatting for highlighting or distinguishing either visually or audibly when rendered, certain names in a recipient list of the e-mail message based on the recipient's criteria settings. For example, the recipient may have settings stipulating that a received e-mail message should highlight in a particular and distinct color his or her team members and supervisors so that they are easily distinguishable from other names included in a recipient list of the e-mail message when displayed in a messaging client 120B.

Therefore, the messaging server 110B looks up, pursuant to the recipient's criteria, instructions on reworking the e-mail message before the e-mail message is then relayed to a recipient's mailbox at the server 110B. In an alternative embodiment, an e-mail message may be displayed at a messaging client 120B, where a user activates an option for distinguishing a subset of names in the message's recipient list which causes the messaging client to rework the e-mail message in accordance with a user's criteria instructions.

FIG. 5A is a diagram of a SMTP e-mail message, showing its constituent parts. A message 500 may include routing information 510, a sender address 520, a list of recipient addresses 525, and a text body 540. The SMTP message format uses a comma to separate recipients in a list, but other variations are possible.

The recipient addresses 525 can be categorized as a direct recipient (530TO), a carbon-copy recipient (530CC), or a blind-carbon-copy recipient (not shown). Each message has at least one recipient (direct, carbon-copy or blind-carbon-copy); additional recipients are optional. As used herein, the term "recipient" applies to direct, carbon-copy and blind-carbon-copy recipients.

Both the sender address 520 and the recipient address 525 share a common address format, which includes a username (550) and a domain name (560). In the SMTP message format, the symbol "@" separates the username 550 and the domain name 560, but other separators are possible, as are other orderings of address components.

When a messaging server 110B reworks an e-mail message to contain formatting for highlighting an entry in a recipient list, one embodiment of the present disclosure utilizes encoded words in message headers which may be a sequence of printable ASCII characters that begins with "=?", ends with "?=", and has two "?"s in between, as generally described in RFC 2047. Therefore, a unique character set may be added to next to an entry in the recipient list to "highlight" and distinguish the entry from others not having the special character set. Also, a descriptive tag may be added to an entry's descriptive name to distinguish the name from others and/or indicate to the messaging client that the name should be highlighted a certain color when displayed. For example, in FIG. 5B, a descriptive name for an entry in the recipient list is contained within quotes, as indicated by bracket 580 where "Adam Smith, President" is the descriptive name attached to the e-mail address adam.smith@foo.com. To illustrate one approach to utilizing a descriptive tag, the descriptive name for "Tim Bracey, Tax Dept." in FIG. 5B has been modified to state "Tim Bracey, Tax Dept. RED". Therefore, the tag RED may be added to an e-mail message to indicate that the entry for Tim Bracey should be displayed in the color red by a messaging client 120. These are but a few examples and are not meant to be limiting. One of ordinary skill in the art would understand that there are a multitude of ways of distinguishing entries in a recipient or participant list.

Using a messaging client, such as the messaging client 120A, a user can view the received e-mail messages 500 and compose e-mail messages for sending. As disclosed herein, a messaging client, such as the messaging client 120A, may use different visual or audible cues (or other sensory cues) when displaying the recipient addresses 525, so that recipients satisfying certain criteria can be distinguished visually from recipients that do not satisfy the criteria. For example, a user can specify what criteria is to be met before a name in the recipient list is highlighted or differentiated from the rest of the entries in the list. For example, differentiation between names of fellow team members included in the recipient list of a recipient that has received the message and names identified in the recipient list who are not team members of the recipient of the message can use different fonts or font attributes, or icons, or position within the recipient list. The classification into different subsets or hierarchies within a recipient list can be based on recipient address, or on associated information about the recipient that is receiving the message and other intended recipients that is available to a messaging server, such as server 1108 or a messaging client 120B.

Figure 8:
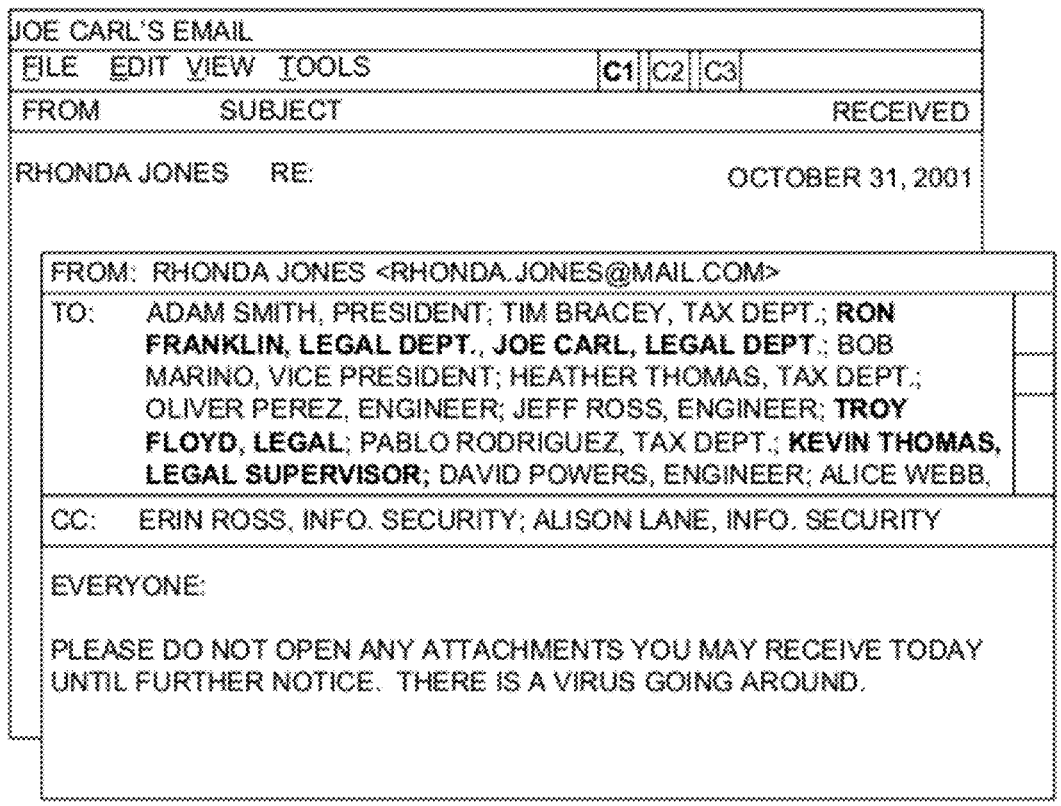

Several examples of visual cues for participant differentiation will be described next, while examples of criteria will be discussed in further detail in connection with FIGS. 6, 7, and 8. FIGS. 6, 7, and 8 illustrate several embodiments of an e-mail message window presented by a messaging client 120B. In each figure, a window displays a single e-mail message. The window 600 includes a recipient address list portion 610, and a body portion 620. As can be seen in FIGS. 6 and 7, a messaging client 120B, typically presents an e-mail message in a user-friendly format, so there is typically not a one-to-one correspondence between the actual message in SMTP format (500) and the message as displayed. For example, the window 600 does not show include routing information 510. In the embodiment of FIG. 6, all of the recipient addresses are displayed in the same manner where one address is not intended to be displayed in a distinguishable fashion from the other. The differentiation feature has not been activated in the window 600 of FIG. 6.

Next, in the embodiment of FIG. 7, a subset of recipient addresses (710A) is displayed with one visual appearance, while another subset of recipient addresses (710B) has another visual appearance. Here, the differentiation feature has been activated.

In this example, the visual appearance of the first subset 710A of addresses includes a bold font as a form of highlighting, and the visual appearance of the second subset 710B of addresses is a non-bold format.

Visual appearance may include a number of options, including, but not limited to, font, font size, font color, font attribute (e.g., underline, italics, bold), and background color. A person of ordinary skill in the art should recognize that these and other options can be used in various combinations to achieve different visual appearances.

The embodiment of FIG. 7 also uses position as a visual cue: a subset of addresses (710A) that satisfy certain criteria appear before another subset of addresses (710B) that does not satisfy the criteria in the list of addresses. This ordering is particularly useful in a relatively long list when a user must scroll down to see the list members at the end of the list, as is the case in FIG. 6. Although the embodiment of FIG. 7 uses two visual cues (appearance and list position) to differentiate subsets of addresses, another embodiment (see FIGS. 8-10) uses the visual appearance cue without the list position cue, and yet another embodiment (not shown) may use the list position cue without the visual appearance cue.

Figure 11:
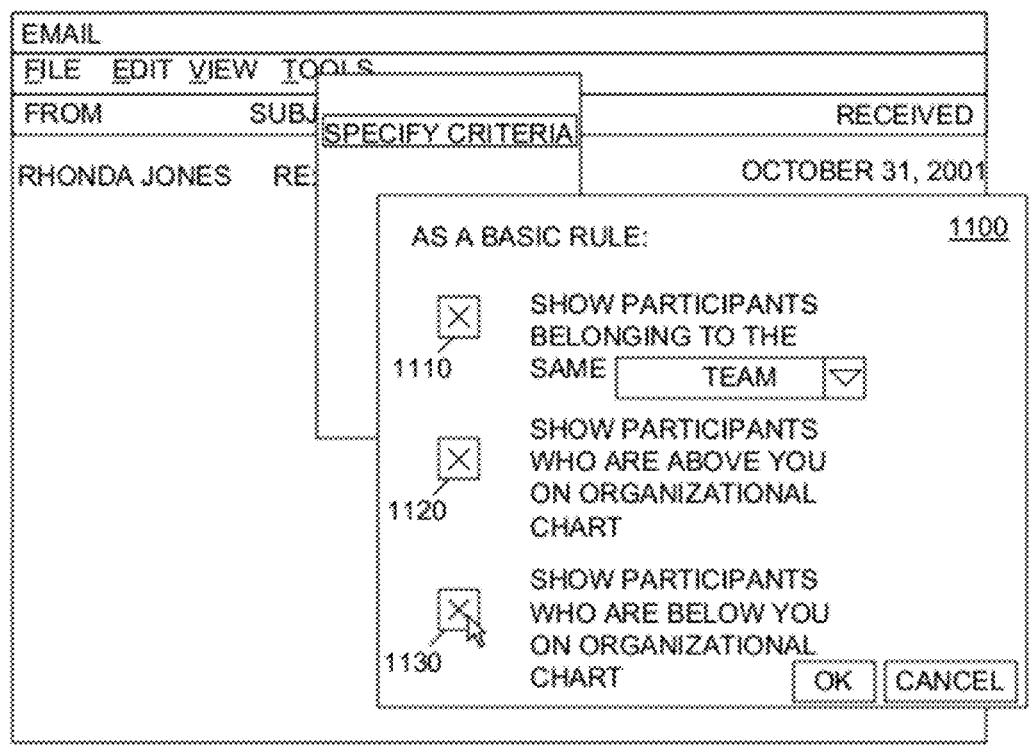
FIG. 11 is a diagram representation of a messaging client interface that may be used to configure criteria to be used to distinguish entries in a recipient list for an e-mail message in accordance with an embodiment of the present disclosure.

In one embodiment, a user can configure his or her messaging client to highlight peers, team members, and supervisors in a received message. This may be a standard configuration for the user. For example, FIG. 11 shows an exemplary embodiment of a user interface that may be used to configure criteria to be used to distinguish entries in a recipient list for an e-mail message. In the example shown, a user may select the boxes corresponding to criteria that the user would like to activate. For example, the user may select to show participants or names in a recipient list that belong to the same team as the user by selecting option 1110. Further, the user may select to show participants or names in a recipient list that are above the user on an organizational chart or hierarchy by selecting option 1120. These may correspond to other persons who have a higher job grade 435 than the user, as a non-limiting example. The user may also select to show participants or names in a recipient list that are below the user on an organizational chart or hierarchy by selecting option 1130. To later alter the configuration of criteria, the user may select or deselect the options provided in the interface 1100. After selection of the criteria by the user, the criteria is stored by messaging server 1108 in one embodiment and used to differentiate names in the recipient list of received e-mail in accordance with the defined criteria before delivering e-mail to the recipient being serviced by the server 1108.

Additionally, in some embodiments, a button may exist on an interface to the messaging client 120B to activate the highlighting of names in the recipient list after a message is received by the recipient. Accordingly, there may be configurable options for defining the criteria that is used to differentiate names in the recipient list.

Figure 12:
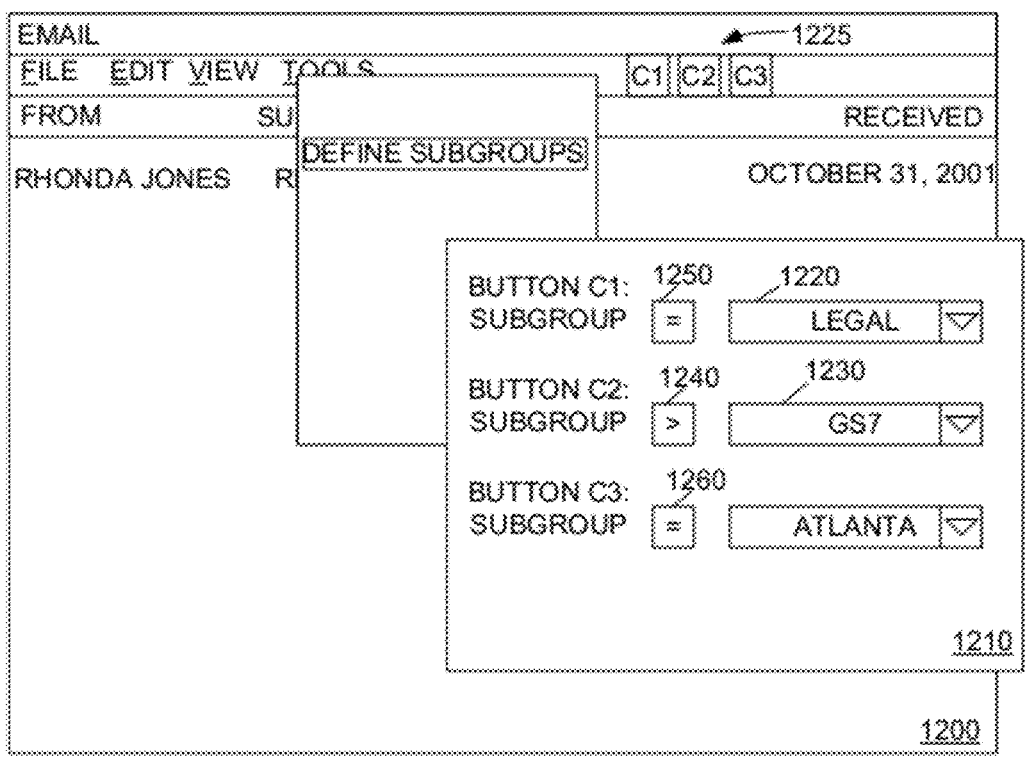
FIG. 12 is a diagram representation of a messaging client interface that allows a user to define subgroups of recipients to be differentiated or highlighted within a window displaying a received e-mail message in accordance with an embodiment of the present disclosure.

As an example, FIG. 12 shows a user interface 1200 of a messaging client, such as an e-mail client, for displaying messages of a user. The user interface 1200 includes a configuration window 1210 that allows a user to define subgroups of recipients to be differentiated or highlighted within a window displaying a received e-mail message. In the example shown, a user can configure interface buttons (C1, C2, C3) 1225 to activate which subgroup of recipients is to be highlighted. For instance, using a dropdown box 1220, the user can specify that names in the recipient list that belong to the legal department should be highlighted when button C1 is activated (e.g., clicked on using a mouse control). To change the criteria from the legal department to another attribute, a different selection from the dropdown box may be selected. For example, for button C2, a different selection has been chosen. Here, the attribute of a particular job grade has been selected (GS7). Further, the "greater than" sign has been selected in box 1240 to indicate that names associated with job grades greater than GS7 should be highlighted in the recipient list. If names associated with job grades having GS7 was desired, than box 1240 could have been selected to be an "equals" sign, similarly to box 1250 and 1260. If names associated with job grades less than GS7, than a "less than" sign could have been selected. Correspondingly, button C3 has been configured so that the interface 1200 highlights names having a job location or office in the city of Atlanta in the recipient list of a received e-mail message when this button is activated.

To illustrate, FIG. 6 shows an e-mail message being displayed in an interface of a messaging client. In this example, none of the buttons C1, C2, or C3 have been activated. Therefore, the feature of highlighting any of the names in the recipient list according to user criteria has not been activated.

In contrast, FIG. 7 shows an e-mail message being displayed in an interface of a messaging client, where button C1 has been activated. As described above, when button C1 is selected, names in the recipient list of a received e-mail being displayed in the client window are highlighted when the names belong to someone in the legal department. In this particular example, the highlighted names 710A (belonging to the legal department) are shown in a bold font and positioned at the beginning of the TO: or CC: fields of the recipient list. The remaining names 710B are shown in a different visual font.

In another embodiment, FIG. 8 also shows an e-mail message being displayed where the button C1 has been activated. However, in this example, the visual appearance of the highlighted names does not change positions within the recipient list. The visual appearance of the subset of the names being highlighted are shown in a bold font however, where the subset of names not being highlighted are not shown in a bold font.

Next, FIG. 9 shows an e-mail message being displayed in an interface 900 of a messaging client, where button C2 has been activated. As described above, when button C2 is selected, names in the recipient list of a received e-mail being displayed in the client window are highlighted when the names belong to someone having a job grade or rank higher than GS7. In this particular example, the highlighted names are shown in a bold font of the recipient list. The remaining names are shown in a different visual font or style.

FIG. 10 shows an e-mail message being displayed in an interface 1000 of a messaging client, where button C2 has been activated. As described above, when button C3 1225 is selected, names in the recipient list of a received e-mail being displayed in the client window are highlighted when the names belong to someone located in Atlanta. In this particular example, the highlighted names are shown in a bold font of the recipient list. The remaining names are shown in a different visual font (e.g., non-bold or a different color).

In some embodiments, more than one button may be activated at a time. For example, buttons C1 and C2 could both be activated at the same time. In such an example, names satisfied with criteria associated with C1 could be displayed in one visual appearance on a window of the messaging client 1208, names satisfied with criteria associated with C2 could be displayed in a different visual appearance on a window of the messaging client 1208, and the remaining names displayed in another visual appearance. Further, a user may be provided an interface for designating how names should be displayed for one subset of names as opposed to another subset of names (e.g., select different colors or font types). Such tools for distinguishing entries in a recipient list are contemplated but not shown in the accompanying drawings due to limitations of the drawings not being in color.

In a corporate environment, particularly for a large corporation, members of the corporation often interact by e-mail because there are so many different groups and projects in existence and often information is submitted from top down and bottom up in a corporate hierarchy. Quite frequently, a corporation member may need to know whether some of his or her team members have already been copied on an e-mail or whether a supervisor was included in the recipient list or the supervisor's supervisor so that the recipient can make an action decision for handling or disposing of that e-mail accordingly. If a recipient receives an e-mail that he or she thinks is important for team members to see and it is able to easily distinguish whether other team members have already been copied on the e-mail, then the recipient does not have to pass it along. Otherwise, if the recipient can easily see that one or two team members did not receive the e-mail, then he or she can take action of sending that information along. As previously explained, when there are many names listed in an e-mail, it is difficult to glance through all those names to see who from the recipient's hierarchy, team members, peers, supervisors, was included on the e-mail using earlier systems.

Figure 13:
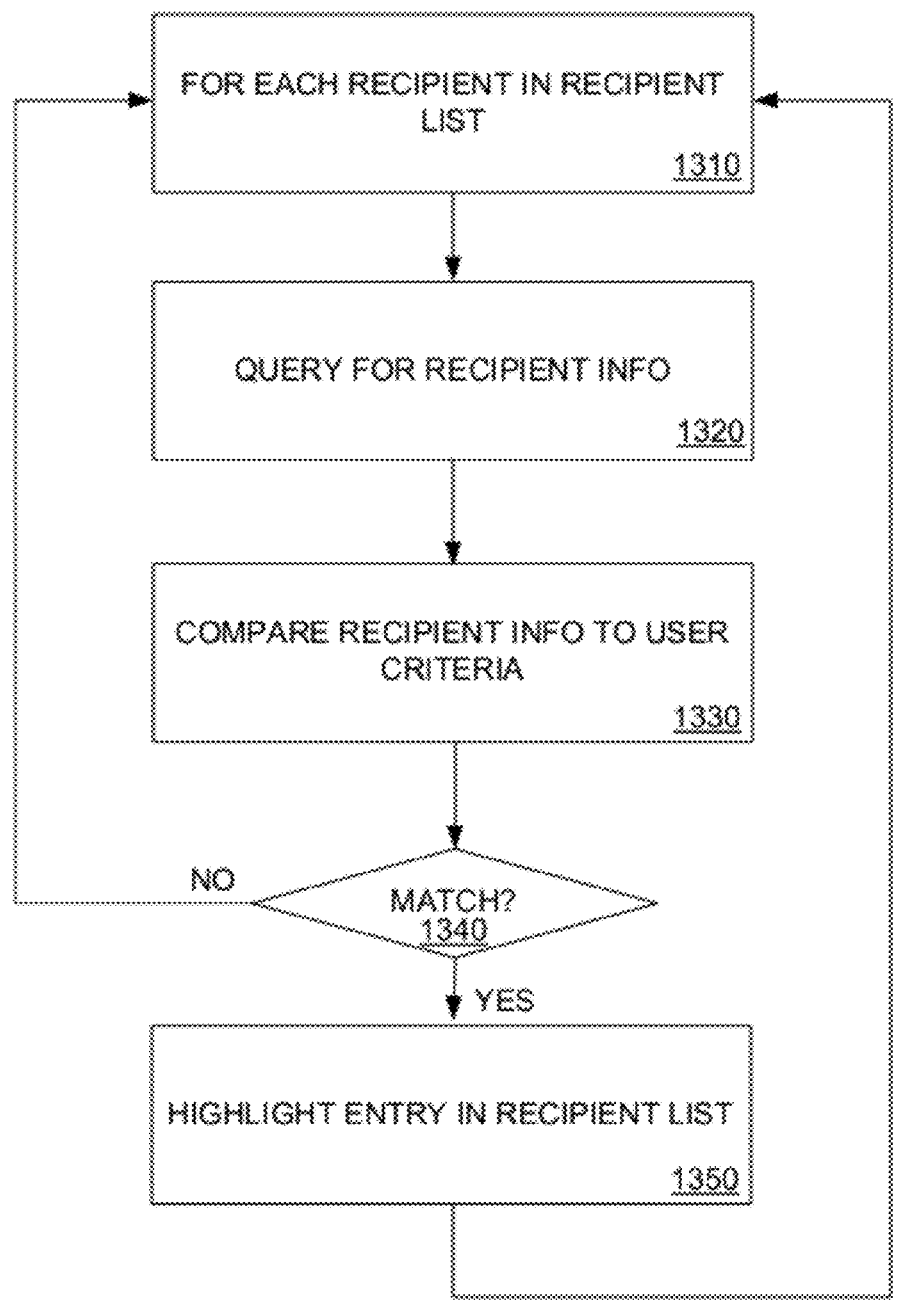
FIG. 13 is a flowchart of an embodiment of a process to determine which visual cue(s) to use when displaying addresses in a messaging client interface in accordance with an embodiment of the present disclosure.

FIG. 13 is a flowchart of an embodiment of a process 1300 which a messaging client 120B, such as an e-mail client, uses to determine which visual cue to use when displaying addresses in a window, such as window 600. This embodiment uses the directory database 160, which may reside in a messaging client 120B, such as an e-mail client, or may reside in a messaging server 1108, such as an e-mail server.

The process starts at block 1310, which begins an iteration loop applied for each entry in the recipient list (525 in FIG. 5A) of the message to be displayed. At block 1320, the directory database 160 is queried for information associated with the current entry in the recipient list from a directory database 160. The information associated with the current entry is compared (block 1330) with specified criteria to be met for highlighting entries in the recipient list.

If the current entry matches criteria (e.g., having an office in Atlanta) indicated by a user for highlighting the entry in the recipient list, block 1340 displays the name associated with the current entry with a visual cue in the recipient list that is associated with the criteria (e.g., use italics font to indicate that the entry is for a person located in Atlanta). If the current entry does not match criteria indicated by a user for highlighting the entry in the recipient list, block 1350 displays the name associated with the entry without highlighting. In the matching operation, a messaging server and/or client may determine whether each entry in a list of participants in the communication matches or satisfies criteria specified by a user participating in the communication. The criteria are used to identify a first subset of participants that are to be rendered in a first style that differentiates the first subset from remaining participants in the list. The computing device may be configured to format the first subset of participants in the first style, in some embodiments. The criteria may further identify a second subset of participants that are to be rendered in a second style that differentiates the subset from the first subset and remaining participants in the list, where the messaging server and/or client is further configured to format the second subset of participants in the second style.

In one embodiment, different font colors are used to distinguish recipients of different subsets (e.g., green for a first subset, orange for a second subset, red for a third subset, etc.). In another embodiment, other font characteristics such as bold and italic are used to distinguish between varying subsets (e.g., normal for a first subset, italics for a second subset, bold for a third subset). In yet another embodiment, both font color and normal/bold/italic characteristics are used to distinguish between different subsets.

Also, a visual cue for distinguishing a subset of addresses may comprise an icon displayed after each address in the subset. Further, as previously addressed, recipients may also be identified with another visual clue: list position. Specifically, certain recipients meeting criteria appear before other recipients in the "To" list. (Conventional mail clients typically display recipients in alphabetical order or in the order the recipients were added to the list.) Therefore, even if the display area is not large enough to show all recipients, a user can quickly see which recipients meet set criteria, without having to bring up a separate recipient list window which displays all recipients.

A messaging server 110 may facilitate messaging communications other than e-mail messages. As an example, a messaging server may facilitate teleconference communications using conference bridge capabilities provided via the messaging server, as an example. To illustrate, in many corporations, conference telephone calls may have 20, 30, 100s of people. To join a conference, a user that is a member of an organization may be connected with the messaging server 110C over a telephone line and enter a unique identifier associated with the user of the organization (e.g., employee number) followed by a pound key to an interactive voice response system of the messaging server 110C. This is depicted in FIG. 14.

Figure 14:
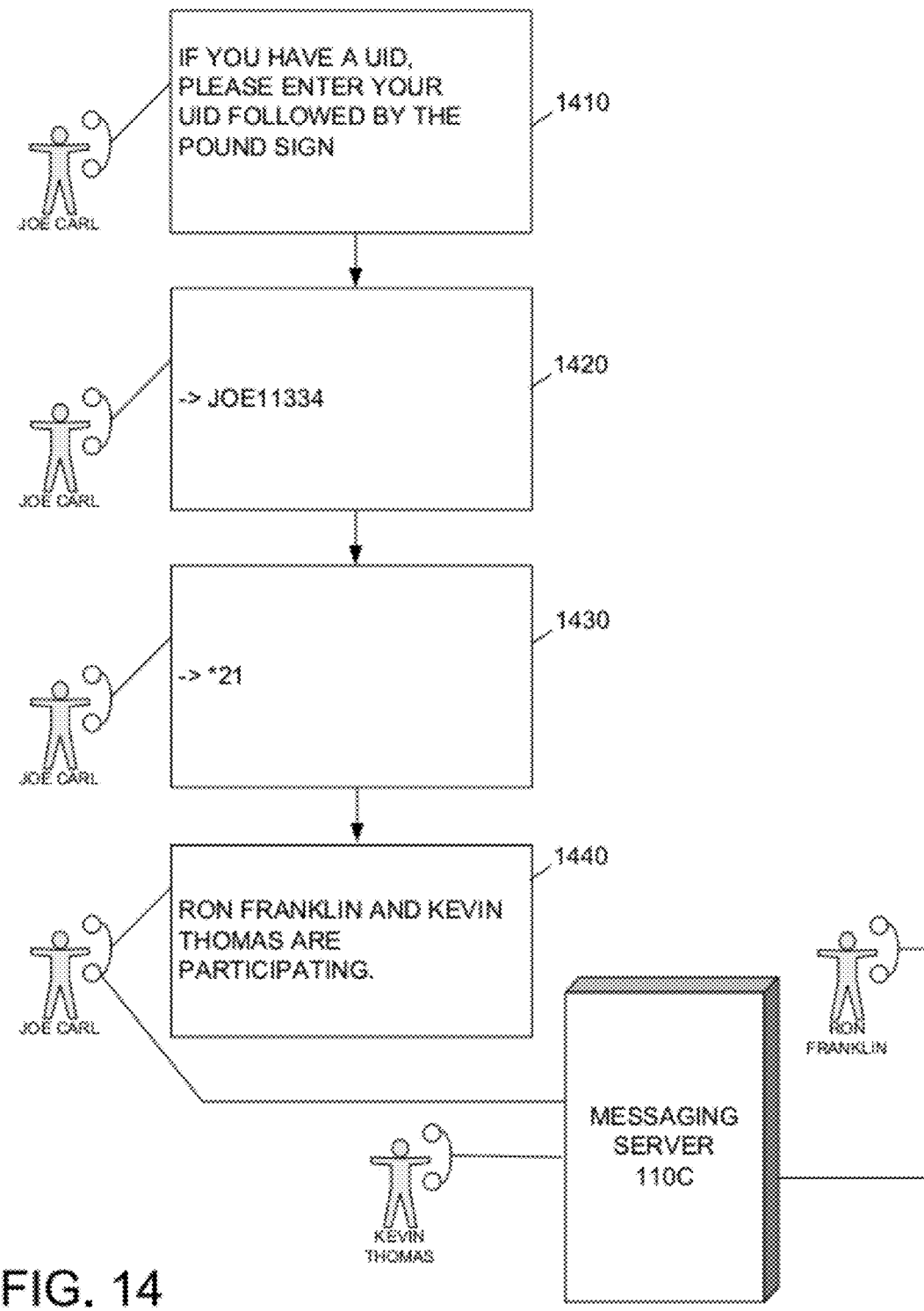
FIG. 14 is a diagram representing a process for differentiating participants in a teleconference in accordance with an embodiment of the present disclosure.

In FIG. 14, the user (Joe Carl) is prompted to enter a user ID (UID) to be used to identify the user, as shown in the first block 1410. In block 1420, the user is shown to enter the requested user ID (UID). The user may also be asked to enter a pin code that is associated with the particular conference that the user is wishing to join.

After commencement of the teleconference, a participant of the conference may therefore wonder whether someone from his or her team is participating in the conference and/or whether his or her boss is also participating in the conference. Therefore, in one exemplary embodiment, a recipient of the teleconference can enter a button or keyboard sequence such as *21, as an example, that is received by the messaging server 110C, as demonstrated in block 1430. By entering the button sequence *21, the user is requesting for an audible highlighting of a subset of participants that meets user criteria. In response to receiving the command, the messaging server 110C retrieves the criteria information stored for the user and obtains participant information from a directory database 160 (using the unique identifier (UID) previously provided by each of the participants) to determine whether any of participants match the user's criteria for highlighting. In this example, assume that the user has specified criteria for audibly highlighting a participant that is a team member of the user and that the user has two team members participating in the conference call.

The messaging server 110C may then "whisper" in a low tone, or some other mode of audible highlighting, to the user that team member Gus White and supervisor Marvin Griffin are participating in the conference, as depicted in block 1440.

Figure 15:
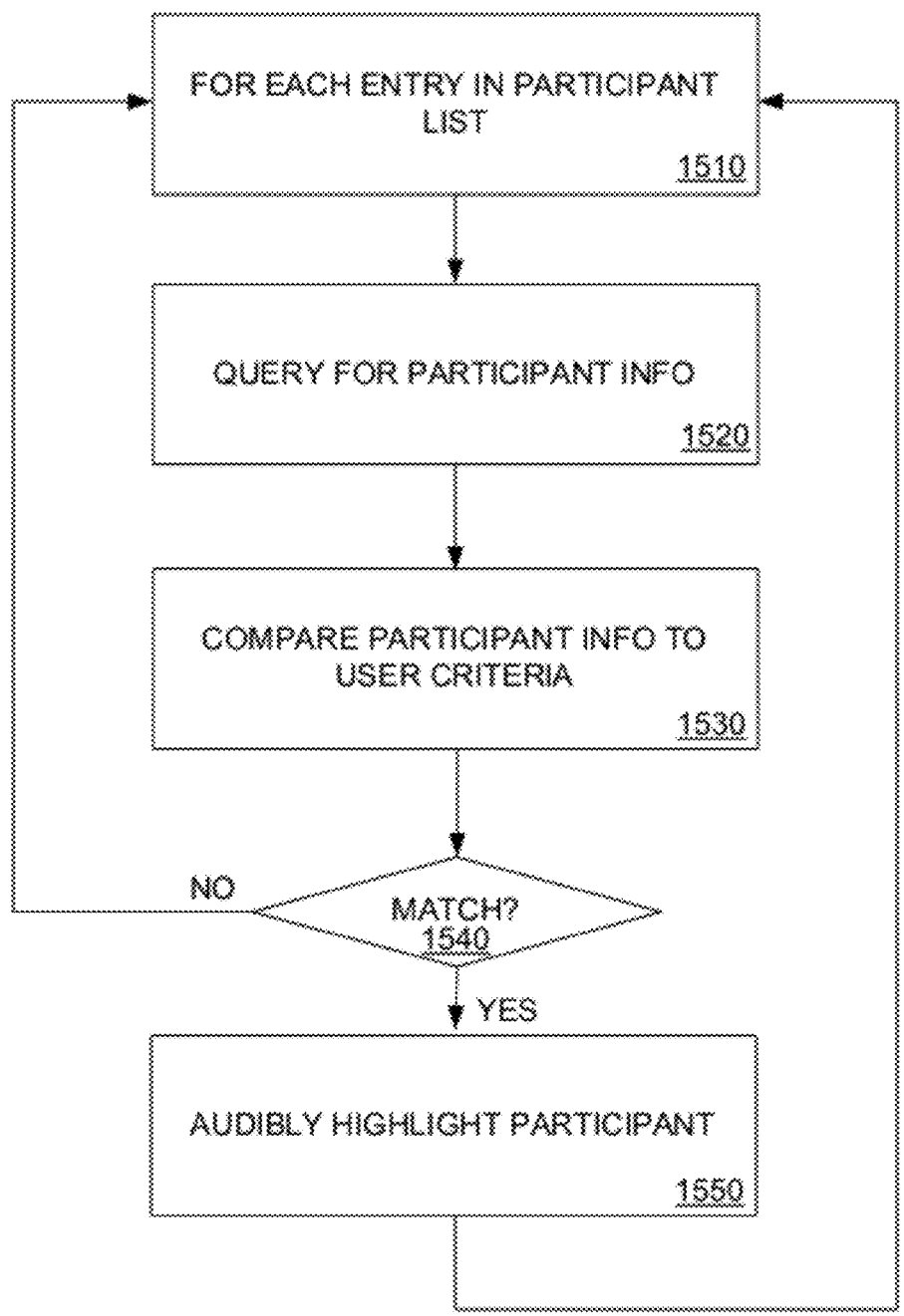
FIG. 15 is a flowchart of an embodiment of a process to determine which audible cue(s) to use when announcing a subset of participants in a conference call in accordance with an embodiment of the present disclosure.

FIG. 15 is a flowchart of another embodiment of a process 1500 which a messaging server 110C, such as that having conferencing bridge capabilities, uses to determine which audible cue to use when announcing a subset of participants in a conference call. This embodiment uses the directory database 160 which may reside in a messaging server 110C.

The process starts at block 1510, which begins an iteration loop applied for each entry in a list of participants in a conference call. At block 1520, the directory database 160 is queried for information associated with the current entry in the participant list from a directory database 160. The information associated with the current entry is compared (block 1530) with specified criteria to be met for highlighting entries in the participant list.

If the current entry matches criteria (e.g., having an office in Atlanta) indicated by a user for highlighting the entry in the participant list, block 1540 announces the name associated with the current entry that is associated with the criteria. If the current entry does not match criteria indicated by a user for highlighting the entry in the participant list, block 1350 does not announce the name. Note, if a messaging client 120C has in addition to an audio speaker for rendering the teleconference audio a visual display of a messaging device, then some embodiments may encompass the displaying of names on the visual display that match the user criteria.

Figure 16:
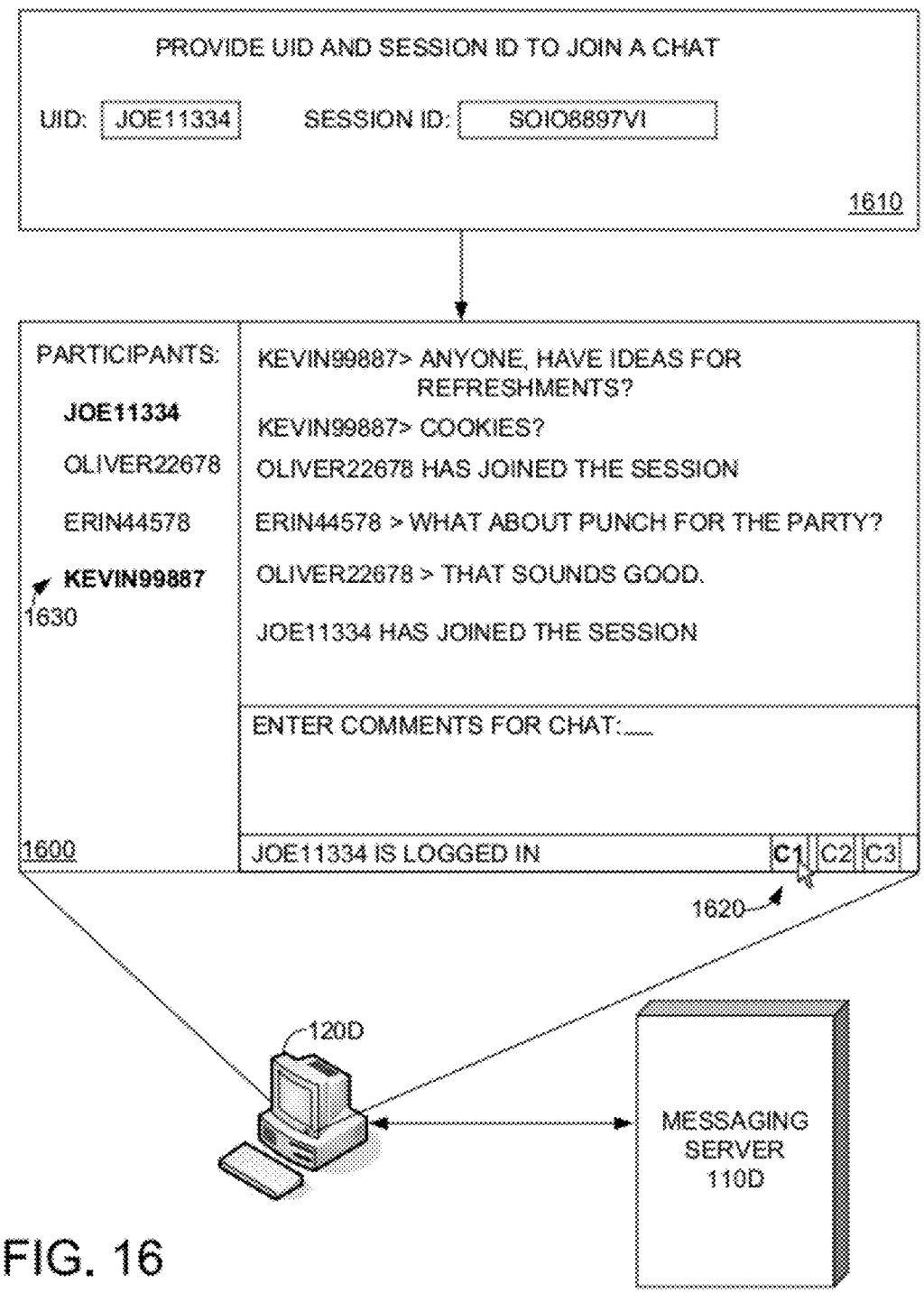
FIG. 16 is a diagram representing a process for differentiating participants in an electronic chat exchange in accordance with an embodiment of the present disclosure.

In one exemplary embodiment, a messaging server 110 may facilitate messaging communications other than e-mail messages and teleconference communications. As an example, a messaging server 110D may facilitate electronic chat communications with a messaging client 120D, as represented in FIG. 16. To join a particular chat session, a user may connect with a messaging server 110D using a messaging client 120D and enter a unique identifier (UID) associated with the user of the organization (e.g., employee number). The user may also enter a session identifier that is associated with the particular chat session that the user is wishing to join. A participant of the session may therefore wonder whether someone from his or her team and/or whether his or her boss is also participating in the chat session. Therefore, in one exemplary embodiment, a participant in the chat session can select an option to request that a list of participants for the chat session be distinguished in accordance with user criteria. In response to receiving the command, the messaging server 110D retrieves the stored user criteria and obtains participant information from a directory database 160 (using the unique identifier previously provided by the user and other participants) to determine whether any participants match the user criteria (e.g., fellow team members). The messaging server 110D may then display a subset of participants on a chat interface 1600 that meets the criteria specified by the user in a fashion that distinguishes the subset from the remaining participants. In the example shown in FIG. 16, Kevin99887 is shown in a bold font indicating that he or she is a team member of fellow participant Joe11334. Use of such techniques may be useful for smartphones or similar devices which have a small real estate (e.g., small display area) to display a long list of recipients/participants.

Figure 17:
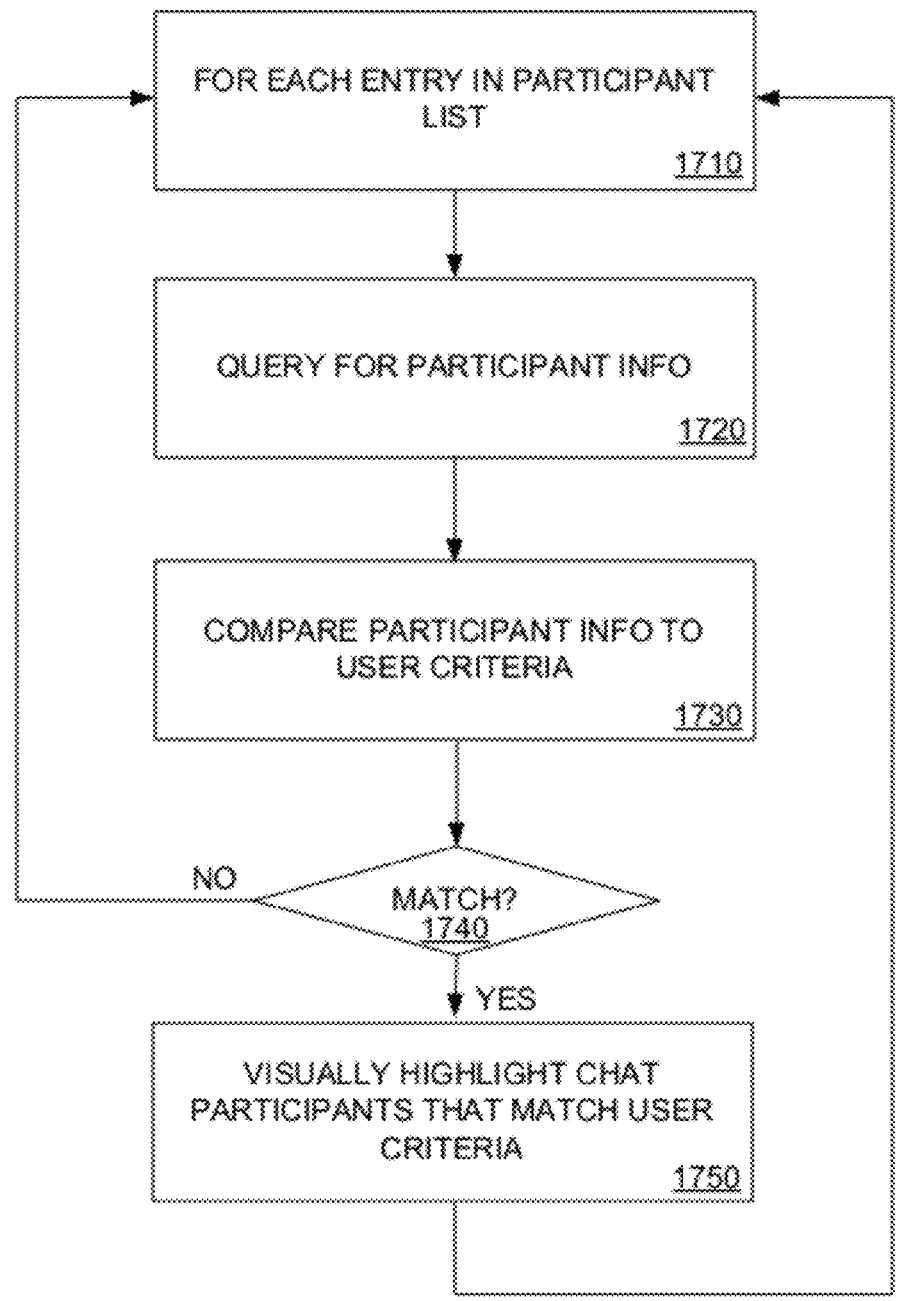
FIG. 17 is a flowchart of an embodiment of a process to determine which visual cue(s) to use when displaying a list of participants in a chat session.

FIG. 17 is a flowchart of another embodiment of a process 1700 which a messaging server 110D, such as that having electronic chat capabilities, uses to determine which visual cue to use when displaying a list of participants in a chat session. This embodiment uses the directory database 160 which may reside in a messaging server 110D.

The process starts at block 1710, which begins an iteration loop applied for each entry in a list of participants of a chat session. At block 1720, the directory database 160 is queried for information associated with the current entry in the participant list from a directory database 160. The information associated with the current entry is compared (block 1730) with specified criteria to be met for highlighting entries in the participant list.

If the current entry matches criteria (e.g., having an office in Atlanta) indicated by a user for highlighting the entry in the participant list, block 1740 displays the name associated with the current entry that is associated with the criteria using a visual cue that distinguishes the name from other names in the list. If the current entry does not match criteria indicated by a user for highlighting the entry in the participant list, block 1350 does not highlight the name in a distinguishing fashion using the visual cue.

Figure 18:
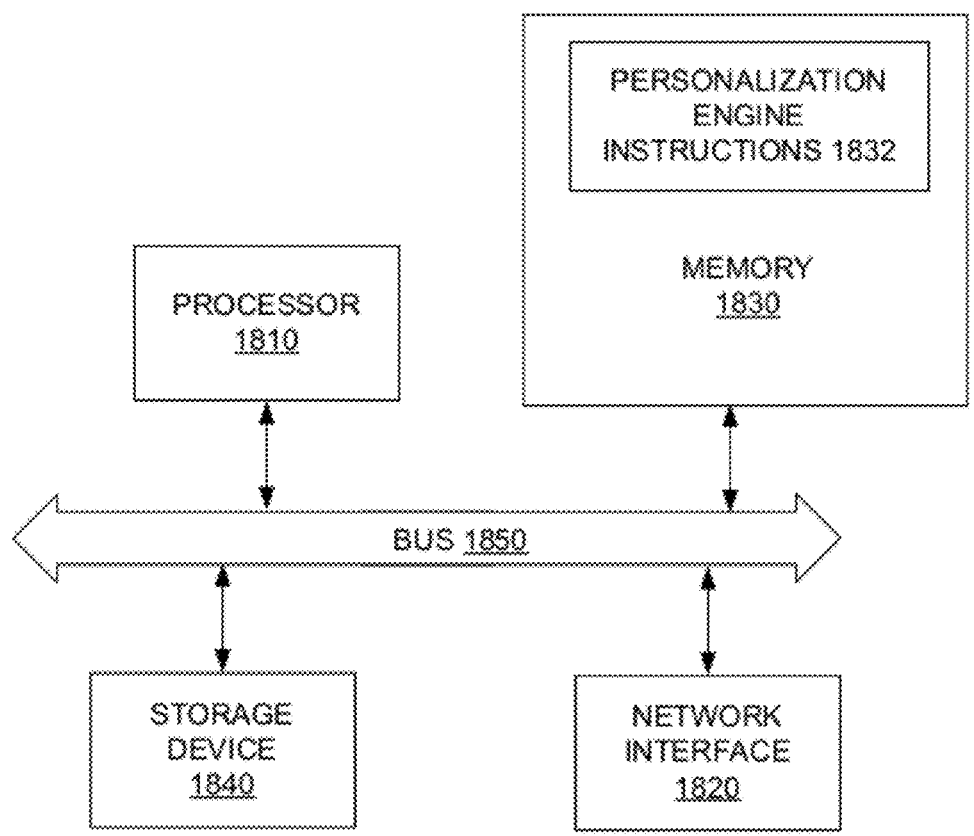
FIG. 18 is a hardware block diagram of a general-purpose computer which can be used to implement various embodiments of a personalization engine in accordance with an embodiment of the present disclosure.

FIG. 18 is a hardware block diagram of a general-purpose computer 1800 or computing device which can be used to implement various embodiments of the messaging server 110. Computer 1800 contains a number of components that are well known in the art of contact center software, including a processor 1810, a network interface 1820, memory 1830, and storage device 1840. Examples of storage device 1840 include, for example, a hard disk, flash RAM, flash ROM, and EEPROM. These components are coupled via a bus 1850. Memory 1830 contains instructions which, when executed by the processor 1810, implement a systems and methods for distinguishing names in a recipient list, such as the processes depicted in the diagrams of FIGS. 13, 15, and 17, which are represented by personalization engine instructions 1832 in memory 1830. The personalization engine instructions may be located at a messaging server 1108 in one embodiment or a messaging client 120B in another embodiment, as discussed hereinbefore. Omitted from FIG. 18 are a number of conventional components that are unnecessary to explain the operation of computer 1800.

The systems and methods for rendering and distinguishing a list of recipients/participants of electronic communications disclosed herein can be implemented in software, hardware, or a combination thereof. In some embodiments, the system and/or method is implemented in software that is stored in a memory and that is executed by a suitable microprocessor situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, or transport the program for use by, or in connection with, the instruction execution system. The computer readable medium can be, for example but not limited to, a system or medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to): an optical fiber; and a portable compact disk read-only memory (CD-ROM). In addition, the functionality could be implemented in logic embodied in hardware or software-configured media.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

Therefore, having thus described embodiments of the present disclosure, at least the following is claimed:

1. A system of rendering recipients in an electronic communication, comprising:
 a computing device of a first user executing personalization engine instructions configuring the computing device to determine whether each entry in a list of recipients to the electronic communication received by the first user satisfies criteria specified by the first user, the criteria being used to identify a first subset of the recipients that is to be rendered in a first style that differentiates the first subset from remaining recipients in the list after receipt by the computing device of the first user, wherein:
  the recipients were selected for the electronic communication by a sender of the electronic communication,
  the first user is one of the recipients to the electronic communication,
  the computing device is configured to format in a rendering of the electronic communication the first subset of recipients in the first style,
  the first subset of recipients is rendered to the first user after the electronic communication commences,
  the computing device retrieves, from a central network server, the criteria specified by the first user that is used to identify the first subset of the recipients in the electronic communication that is to be rendered in the first style that differentiates the first subset from the remaining recipients in the list,
  the computing device retrieves recipient information from data field entries of a directory database over a communication network, wherein the recipient information is used to identify the first subset of recipients that is to be rendered in the first style from the remaining recipients in the list,
  second criteria specified by a second user in the recipient list is used to identify a second subset of recipients in the electronic communication that is to be rendered in a second style that differentiates the second subset from the remaining recipients in the list on a second computing device of the second user after receipt by the second computing device of the second user, and
  the criteria further identifies a third subset of recipients that is to be rendered in a third style that differentiates the third subset from the first subset and remaining recipients in the list, the computing device further configured to format the third subset of recipients in the third style.

2. The system of claim 1, further comprising:
 the directory database configured to provide information on a recipient provided in the list so that the computing device can determine whether the recipient matches the criteria.

3. The system of claim 1, wherein the first style comprises rendering the first subset of recipients in a visual font that is different than the font used to render remaining recipients in the list of recipients.

4. The system of claim 1, wherein the first style comprises audibly announcing the first subset of recipients to the first user during the electronic communication.

5. The system of claim 1, wherein the electronic communication comprises at least one of e-mail communication; a teleconference; or an electronic chat exchange.

6. The system of claim 1, wherein the computing device comprises a messaging server that facilitates the electronic communication with a messaging client.

7. The system of claim 1, wherein the computing device comprises a messaging client that is being serviced by a messaging server that facilitates the electronic communication.

8. The system of claim 1, further comprising:
a user interface graphically providing options to configure criteria used to differentiate entries in the list of recipients.

9. A method of rendering recipients in an electronic communication, comprising:
determining, by a first computer of a first user, whether each entry in a list of recipients to the electronic communication received by the first user satisfies criteria specified by the first user, the criteria being used to identify a first subset of the recipients that is to be rendered in a first style that differentiates the first subset from remaining recipients in the list after receipt by the first computer of the first user; and
formatting in a rendering of the electronic communication, by the first computer, the first subset of the recipients in the first style, wherein:
the recipients were selected for the electronic communication by a sender of the electronic communication,
the first user is one of the recipients to the electronic communication,
the first subset of recipients is rendered to the first user after the electronic communication commences,
the first computer retrieves, from a central network server, the criteria specified by the first user that is used to identify the first subset of the recipients in the electronic communication that is to be rendered in the first style that differentiates the first subset from the remaining recipients in the list,
the first computer retrieves recipient information from data field entries of a directory database over a communication network,
the recipient information is used to identify the first subset of recipients that is to be rendered in the first style from the remaining recipients in the list,
second criteria specified by a second user in the recipient list is used to identify a second subset of recipients in the electronic communication that is to be rendered in a second style that differentiates the second subset from the remaining recipients in the list on a second computer of the second user after receipt by the second computer of the second user, and
the criteria further identifies a third subset of recipients that is to be rendered in a third style that differentiates the third subset from the first subset and remaining recipients in the list; and
formatting the second subset of recipients in the third style.

10. The method of claim 9, further comprising:
rendering the first subset of recipients in a visual font that is different than the font used to render remaining recipients in the list of recipients.

11. The method of claim 9, further comprising:
audibly announcing the first subset of recipients to the first user during the electronic communication.

12. The method of claim 9, wherein the electronic communication comprises at least one of e-mail communication, a teleconference, and an electronic chat exchange.

13. The method of claim 9, further comprising graphically presenting a user interface having options to configure criteria used to differentiate entries in the list of recipients.

14. The method of claim 9, wherein the determining act occurs in response to selection of an interface option by the first user after the electronic communication is received by the first user.

15. A computer readable medium storing a program for rendering recipients in an electronic communication when executed by a computer, the program comprising:
code that determines whether each entry in a list of recipients to the electronic communication received by a first user satisfies criteria specified by the first user that is one of the recipients to the electronic communication, the criteria being used to identify a first subset of the recipients that is to be rendered in a first style that differentiates the first subset from remaining recipients in the list after receipt by the computer of the first user; and
code that formats in a rendering of the electronic communication the first subset of the recipients in the first style, wherein:
the recipients were selected for the electronic communication by a sender of the electronic communication,
the first user is one of the recipients to the electronic communication, and
the first subset of recipients is rendered to the first user after the electronic communication commences;
code that retrieves, from a central network server, the criteria specified by the first user that is used to identify the first subset of the recipients in the electronic communication that is to be rendered in the first style that differentiates the first subset from the remaining recipients in the list,
code that retrieves recipient information from data field entries of a directory database over a communication network, wherein:
the recipient information is used to identify the first subset of recipients that is to be rendered in the first style from the remaining recipients in the list,
second criteria specified by a second user in the recipient list is used to identify a second subset of recipients in the electronic communication that is to be rendered in a second style that differentiates the second subset from the remaining recipients in the list on a second computer of the second user after receipt by the second computer of the second user, and
the criteria further identifies a second subset of recipients that is to be rendered in a second style that differentiates the second subset from the first subset and remaining recipients in the list; and
code that formats the second subset of recipients in the second style.

16. The computer readable medium of claim 15, further comprising code that renders the first subset of recipients in a visual font that is different than the font used to render remaining recipients in the list of recipients.

17. The computer readable medium of claim 15, further comprising code that audibly announces the first subset of recipients to the first user during the electronic communication.

18. The computer readable medium of claim 15, wherein the electronic communication comprises at least one of e-mail communication, a teleconference, and an electronic chat exchange.

19. The computer readable medium of claim 15, further comprising code that graphically presents a user interface having options to configure criteria used to differentiate entries in the list of recipients.

20. The computer readable medium of claim 15, wherein the determining act occurs in response to selection of an interface option by the first user after the electronic communication is received by the first user.

\* \* \* \* \*